Nov. 13, 1956  E. A. WILCKENS  2,770,083
TUBE HANDLING APPARATUS
Filed Oct. 28, 1953  6 Sheets-Sheet 1

INVENTOR:
Eibe A. Wilckens,
BY Cushman, Darby & Cushman
ATTORNEYS.

Nov. 13, 1956  E. A. WILCKENS  2,770,083
TUBE HANDLING APPARATUS
Filed Oct. 28, 1953  6 Sheets-Sheet 5

INVENTOR:
Eibe A. Wilckens,
BY Cushman, Darby & Cushman
ATTORNEYS.

United States Patent Office 2,770,083
Patented Nov. 13, 1956

2,770,083

TUBE HANDLING APPARATUS

Eibe A. Wilckens, Baltimore, Md., assignor to Crown Cork & Seal Company, Inc., Baltimore, Md., a corporation of New York Application October 28, 1953, Serial No. 388,740

30 Claims. (Cl. 53—76)

The present invention relates to an apparatus for inserting closures into containers or the like and then positioning the containers onto a conveyor. More particularly, the present invention relates to an apparatus for inserting closures into elongated cylindrical tubes while the tubes are being transferred from one angular position to another so that the tubes may be properly positioned on a conveyor.

In the manufacture of crown type closures for use in capping bottled beverages, it is necessary to provide a cork disc or the like on the inside of the metal shell and, thus, providing a surface upon which the top of the bottle forms a seal. Cork discs, in present-day manufacturing practices, are composed of a mixture of properly screened cork particles and an adhesive material. The mixture of granulated cork and adhesive is compressed into molds such as elongated cylindrical metal tubes and is then baked. After baking, the product is removed from the molds in the form of composition cork rods. After the cork rods have been properly seasoned, they are then sliced into discs for insertion into the metal shell to form the end product of a crown-type closure.

The machines, commonly known as packing machines, in present use for receiving the elongated tubular molds and filling them with granulated cork and adhesive and then compressing and baking the mixture to form a cork composition rod, require that the molds be positioned vertically on a conveyor so that they may be received vertically into the machine. Heretofore, the elongated cylindrical tubes have been manually placed on the conveyor leading to the packing machine.

Therefore, an object of the present invention is to provide an apparatus which will properly place elongated tubes on conveyors in a vertical position. The present invention provides for successively orienting horizontally lying tubes into a vertical position and onto a conveyor which feeds the tubes to packing machines for manufacturing composition cork rods.

Since the composition cork rods, after they have been baked, have to be removed from the tube or mold so that they may be seasoned and then sliced into cork discs, the tubes are generally provided with one end thereof inturned so as to retain a plug or closure inserted in the other end thereof. The plug or closure may be pushed through the tube to remove the cork rod therefrom after proper treatment in the baking oven. The closure or plug must be reinserted into the elongated cylindrical tube before the tube can again be used as a mold. Heretofore, it has been a practice to manually insert the plug into the open end of the tube and let it fall into place on the inturned or rolled end of the tube.

Therefore, another object of the present invention is to provide an apparatus which will automatically insert the closure or plug into the elongated tube. Ancillary to this object, it is a further object of the invention to provide an apparatus which will insert the plug into the tube as the tube is being oriented from a horizontal to a vertical position prior to its positioning on the conveyor which transfers it to the cork rod packing machine.

Another object of the present invention is the provision of an apparatus having controls which are simple and efficient whereby minimum observation by an operator is necessary.

Ancillary to the preceding object, the present invention provides controls which are actuated by the tubes leaving the apparatus. Each tube leaving the apparatus will control the start of a complete cycle of operation of the apparatus, leaving the operator free to perform other duties incidental to the manufacture of cork rods.

A further object of the invention is to provide an apparatus with controls for performing different operations during a cycle of operation of the apparatus and which are operated in timed sequence with the same.

A still further object of the present invention is to provide means for properly positioning a closure with respect to the tube being oriented so that the closure may be easily inserted in the tube as it is oriented.

Still another object of the present invention is to provide an apparatus which is actuated by fluid operated controls.

A still further object of the present invention is to provide an apparatus which can be easily moved out of position from the conveyor line so that any necessary overhaul or repairs can be made thereto or to the associated conveyor or cork packing machine.

These and other objects of the present invention will appear more fully in the following specification, claims and drawings in which:

Figures 7 through 10a, inclusive, are enlarged views disclosing the various cams used in controlling various operations of the apparatus during a cycle of operation of the apparatus.

*General*

Referring specifically to the drawings wherein like character and reference numerals represent like or similar parts, the apparatus of the present invention includes a frame 10 having standards 12 which support an upper surface or work table 38. The base ends of standards 12 are bifurcated as shown at 13 and have rollers 14 mounted therebetween. Rollers 14 are adapted to engage tracks 16, thus, supporting the apparatus for movement on the tracks. By having the apparatus mounted on tracks 16, it is obvious that the apparatus may be rolled into position with a conveyor 30 leading to the cork rod packing machine (not shown) or may be rolled away from the conveyor so that the apparatus may be overhauled or repaired as the situation may be. Suitable means, such as the nuts and bolts 18, are provided so that the apparatus may be locked in position adjacent take-off conveyor 30. Nuts and bolts 18 pass through the bifurcated base ends of standards 12 and through suitable apertures in tracks 16.

Mounted for rotation on work table 38 of frame 10 is a frusto-conical carrier member generally indicated 20. Frusto-conical carrier member 20 is adapted to receive containers, such as elongated cylindrical tubes 22, from a hopper 24, as well as closures 26 from a hopper 28. Elongated cylindrical tubes 22 which have one end thereof rolled inwardly are received horizontally on the frusto-conical member 20. A closure or plug 26 is positioned adjacent the open end and opposite the rolled-in end of the tube. Carrier member 20 is rotated in step by step increments of movement and as it rotates, tubes 22 positioned horizontally thereon will be oriented to a vertical position. Simultaneously with the orientation of tubes 22, closures 26 are inserted into tubes 22 so that when the tube is in the vertical position the closure will be in the bottom of the tube resting on the inturned rolled end. In the vertical position, tubes 22 are transferred from carrier member 20 to out-feed conveyor 30 which conveys them to the cork packing machine (not shown). It will be obvious that the tubes 22 with the plug or closure 26 inserted therein will serve as molds for receiving granulated cork and an adhesive binder which is to be baked in an oven to form cork rods that are sliced into cork discs for use in crown type closure caps. However, it is within the contemplation of the present invention that containers other than elongated tubes could be used where it is necessary to orient the container from a horizontal to a vertical position and/or where it is necessary while orienting the container to insert a closure therein.

*Orienting mechanism*

Figures 1, 1A, 1B:
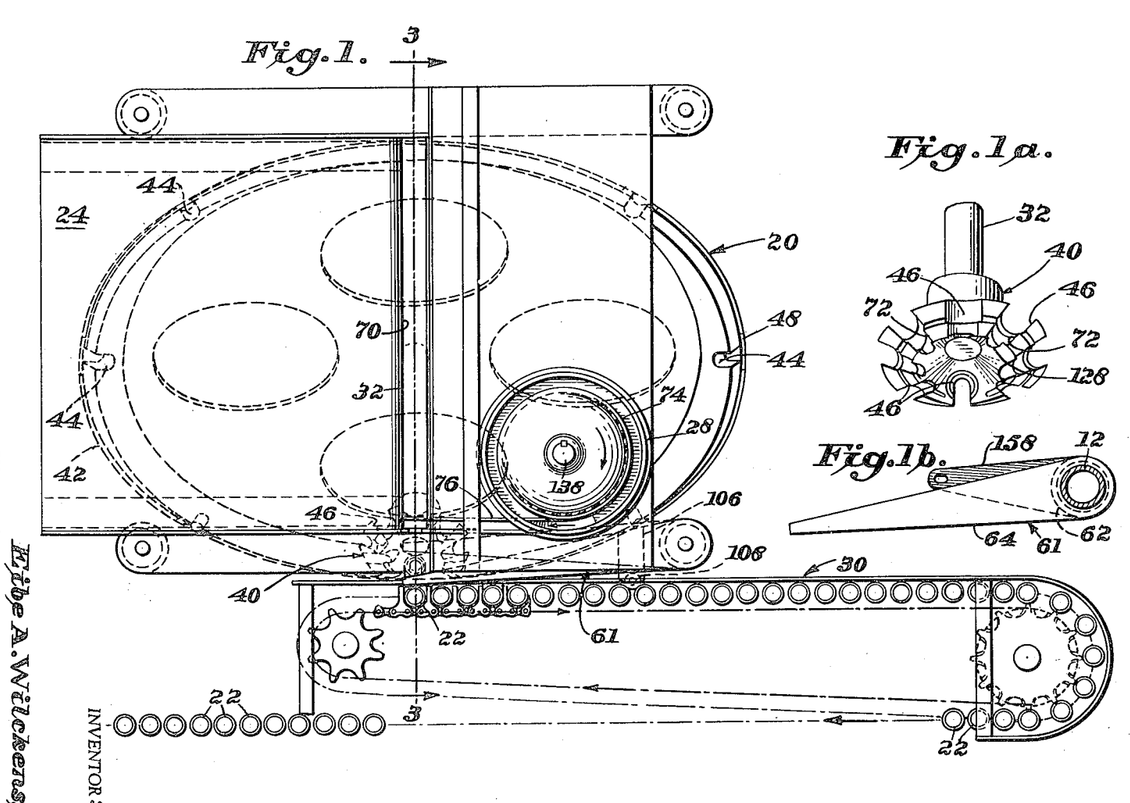
Figure 1 is a plan view of the apparatus with portions thereof omitted for the purpose of clarity.
Figure 1a is a detailed view of the upper tube receiving and closure positioning dial.
Figure 1b is a detailed view of the tube ejector mechanism.
Figure 2:
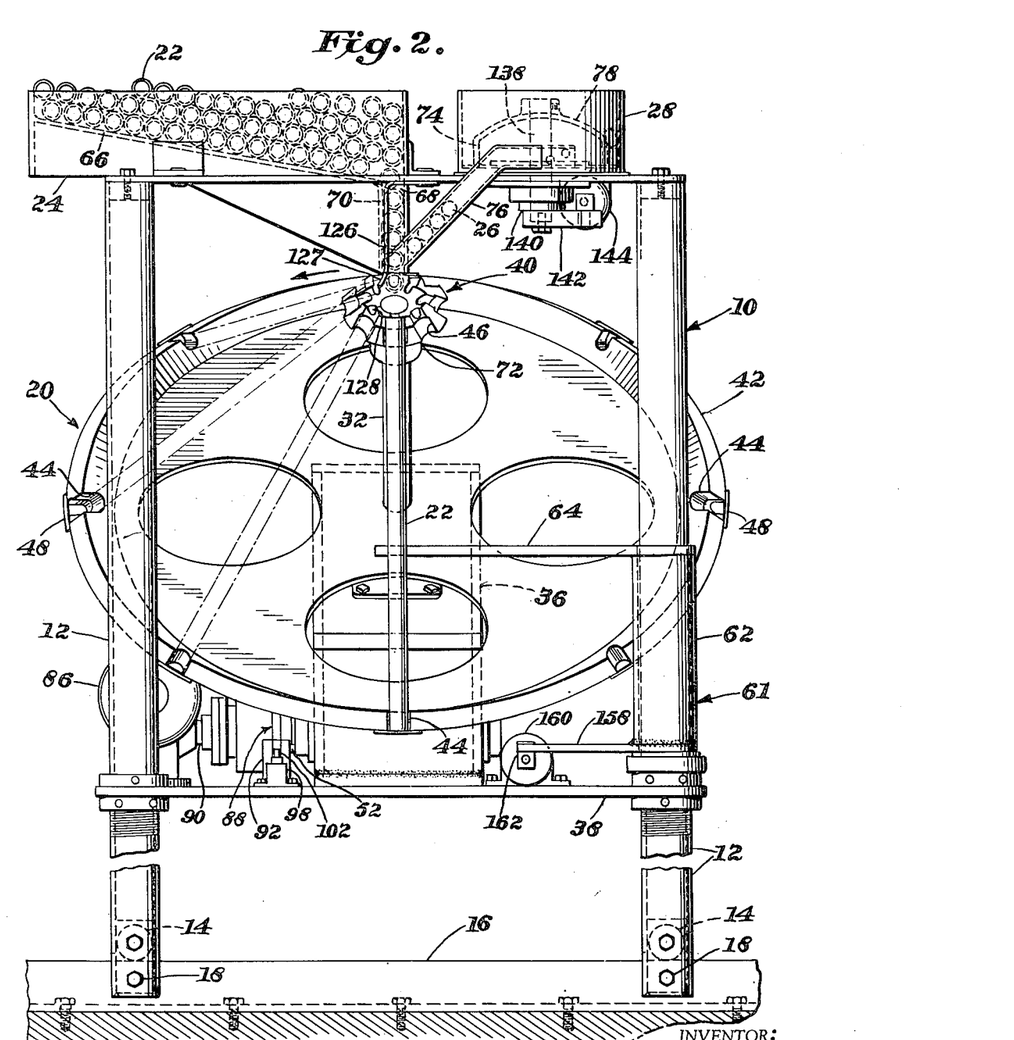
Figure 2 is a front elevational view of the apparatus showing tubes and closures being positioned thereon, the take-off conveyor shown in Figure 1 being omitted for purposes of clarity.
Figure 3:
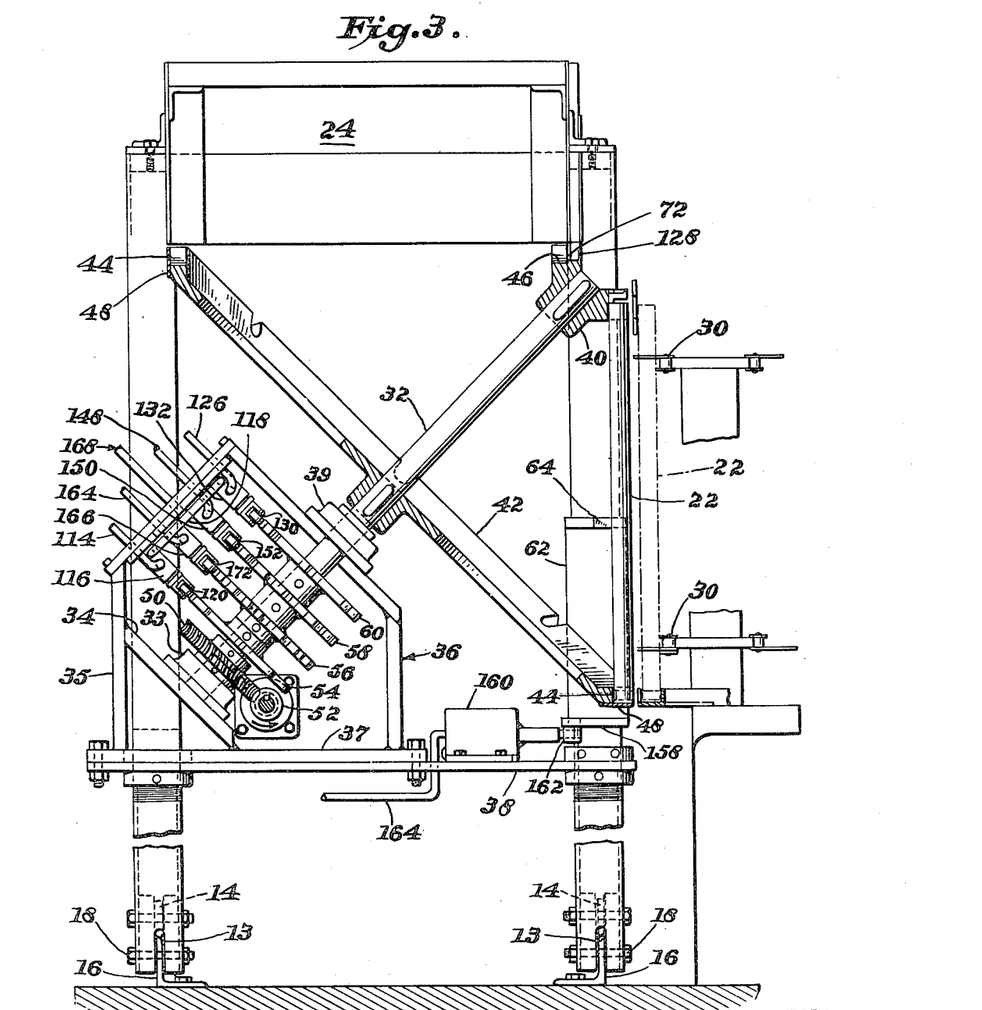
Figure 3 is a side elevational view of Figure 2, partly in cross-section and looking from the left of Figure 2 the clutch and motor shown in Figure 2 being omitted for purposes of clarity.

Referring now to Figures 1 to 3, inclusive, as previously stated, the apparatus of the present invention is provided with a rotatable frusto-conical carrier member 20 for orienting the containers, such as the elongated tubes 22, from a horizontal to a vertical position. Carrier member 20 is mounted on a shaft 32 which has the lower portion thereof journalled in a gear box housing 36 mounted on work table 38. In more detail, shaft 32 is journalled for rotation at its lower end in suitable bearings 33 mounted on a plate 34 supported by a wall 35 and base 37 of gear box housing 36. Shaft 32 is further supported by bearings 39 mounted on the top of gear box housing 36 where it extends therethrough. By mounting shaft 32 in the above manner, it will be noted that shaft 32 is journalled on an axis substantially 45° to the horizontal or vertical.

Carrier member 20 includes an upper dial 40 and a larger lower dial 42, both rigidly mounted on shaft 32. As clearly shown in the drawings, the size of the lower dial with respect to the upper dial is such that the carrier member 20 has a frusto-conical shape. In other words, the lower dial 42 provides the base of a frustrum of a cone while the upper dial provides the top of the frustrum of the cone. Consequently, since carrier member 20 has the shape of the frustrum of a cone, and since it is mounted for rotation on an axis at an oblique angle to the vertical and horizontal, the frustrum of the carrier member provides a means for orienting the containers horizontally positioned thereon to a vertical position.

Lower dial member 42 is provided on its peripheral surface with a plurality of spaced semi-circular recesses 44 while upper dial member 40 is also provided with a like number of spaced semi-circular recesses 46. Recesses 44 of lower dial 42 are in longitudinal alignment with recesses 46 of upper dial 40 and, as previously explained, since the dials are of different sizes, a tube having its ends positioned in the uppermost recesses 44 and 46 of lower and upper dials 42 and 40, respectively, will lie in a substantially horizontal position. When carrier member 20 has been rotated 180°, tube 22 supported in recesses 44 and 46 will have been oriented from a substantially horizontal position to a vertical position. Since tubes 22 are transferred from the horizontal to the vertical, they will longitudinally slide out of the recesses due to centrifugal and gravitational forces unless means are provided to prevent this from occuring. Therefore, a plate 48 is provided over the outer edge of each of the recesses 44 to support tube 22 when in the vertical position and to retain the tube when carrier member 20 is rotated.

Dials 42 and 40 are suitably keyed to shaft 32 so that they may be easily removed and replaced with dials containing larger or smaller recesses 44 and 46 as the situation may be where different diameter cylindrical tubes or containers are used. Also, it is within the scope of the invention to adjustably space dials 40 and 42 with respect to each other so that different length tubes may be accommodated.

Mounted on the portion of the lower end of shaft 32 which is housed in gear box housing 36 is a worm gear 50 adapted to engage a worm 52. As will be explained later in the specification under the heading "Controls," suitable means are provided to intermittently rotate worm 52 to transmit rotary movement to worm gear 50 and shaft 32 and, thus, rotate carrier member 20 so that it brings the recesses 44 and 46 into register with the tube or container feeding means. Also mounted in gear box 36 on shaft 32 are a plurality of cams 54, 56, 58 and 60, which provide for various operations during the cycle of operation of carrier member 20. The controls operated by cams 54, 56, 58 and 60 will be discussed in more detail later in the specification also under the separate heading "Controls." As previously mentioned, take-off conveyor 30 is provided to receive tubes 22 from carrier member 20 when they have been oriented to a vertical position. Take-off conveyor 30 will receive the tubes in a vertical position and will transfer them to the conveyor leading to the cork rod packing machine as shown or directly to the cork rod packing machine. Mounted above table 38 on one of the standards 12 of frame 10 is an ejector mechanism, generally indicated as 61, and including a freely rotatable collar 62 having an arm 64 extending radially therefrom between upper and lower dials 40 and 42. Arm 64 is actuated by rotation of collar 62, and will engage tube 22 when it has reached its vertical position and will transfer the same from carrier member 20 to take-off conveyor 30. The controls for operating the ejector arm 64 will be explained in more detail later in the specification. Take-off conveyor 30, as previously stated, will transfer the vertically positioned containers to a cork rod packing machine or to any other type of machine where it is necessary that the containers be vertically positioned prior to reception thereby

*Tube and closure feed*

Mounted in any suitable manner on standards 12 of frame 10 above carrier member 20 is the hopper 24 in which elongated cylindrical tubes 22 are stored. Hopper 24 is provided with a sloping bottom 66 and an outlet 68 at the lower end thereof. Attached to hopper 24 at its outlet 68 is a vertically extending chute 70 which terminates adjacent the uppermost portion of carrier member 20.

Tubes 22 are placed in hopper 24 so that their rolled or inturned ends will be positioned to be received in recesses 44 of lower dial 42 of the carrier member. The tubes are horizontally positioned in the hopper 24 and will feed by gravity down the inclined bottom 66 to the chute 70 where they will be successively fed to carrier member 20 as it is rotated to bring recesses 44 and 46 into registry therewith. As is now evident, the tubes will thus fall into position in the recesses and be supported at each of its ends by the dials 40 and 42. When the dial is rotated in a counter-clockwise direction, as shown in Figure 2, it will carry with it one of the tubes 22 and the next tube 22 will be received in the next recesses of dials 40 and 42 to come into registry with chute 70. Thus, tubes are successively fed to carrier member 20 as it intermittently rotates, and simultaneously tubes positioned on carrier member 20, that have been oriented to the vertical position, will be transferred to take-off conveyor 30.

Referring specifically to Figure 1a, it will be noted that upper dial 40 is provided with a plurality of recesses 72 which are in open communication and longitudinal alignment with recesses 46. Further, recesses 72 are of a smaller diameter than recesses 46. The purpose of providing recesses 72 on dial 40 is to receive and position one of the closures or plugs 26 on its end so that it may be centered for insertion into an adjacently positioned elongated tube 22.

Figure 5:
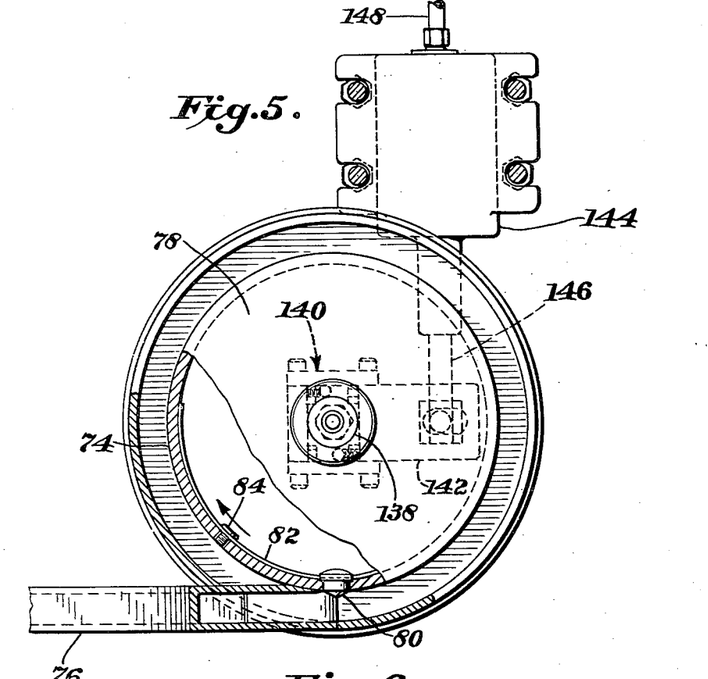
Figure 5 is an enlarged plan view partly in cross-section of the closure hopper and its operating means.
Figure 6:
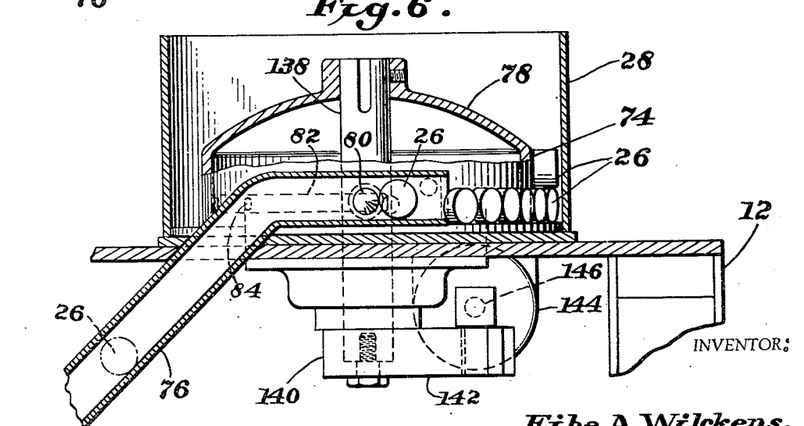
Figure 6 is a side elevational view of the closure hopper shown in Figure 5.

Also mounted above carrier member 20 on the standards 12 of frame 10 is a hopper 28 for supplying closure or plug inserts 26 to recesses 72. Hopper 28 is provided with a rotatable cylindrical element 74 of less diameter than the inside diameter of the hopper. In other words, the distance between the outside wall of cylindrical member 74 and the inside wall of hopper 28 is substantially the thickness of the closure 26 and, thus, the closure will be oriented onto its end so that it may be fed on its end into recesses 72 of upper dial 40. Connected to hopper 28 and extending downwardly therefrom is a delivery chute 76 through which plugs 26 are transferred from hopper 28 and are delivered to one of the recesses 72. The end of chute 76 terminates above dial 40 so that plugs fed down the chute will be properly positioned in the recess 72 as the recesses come into registry with the end of the chute. Referring now to Figures 5 and 6 it will be noted that cylindrical element 74 is provided with a dome shape cover 78 so that closures 26 will slide by gravity to a position between the vertical walls of element 74 and hopper 28. Also, cylindrical element 74 is provided with a lug 80 extending radially through its wall whereby the lug 80 will engage closures properly positioned between the wall of cylindrical element 74 and hopper 28 to agitate and urge the closures down the chute 76. Lug 80 is spring mounted so that if there is a jam it may be biased out of engagement with the closures 26. Lug 80 is mounted on the spring finger 82 which is rigidly attached at its medial point by a screw or the like 84. When element 74 is rotated in a clockwise direction as shown in Figure 5, the lug 80 will be biased inwardly when it engages the inner wall of chute 76 as shown in Figure 5, but will immediately resume its normal projecting position as soon as the obstruction is passed.

Suitable means are provided for rotating cylindrical element 74 intermittently during an increment of rotation of carrier member 20. By having cylindrical element 74 rotate in small intermittent increments of rotation the closures in hopper 28 will be properly agitated and fed down chute 76. A detailed explanation of the control means for rotating element 74 will be explained later in the specification.

Controls

Figure 4:
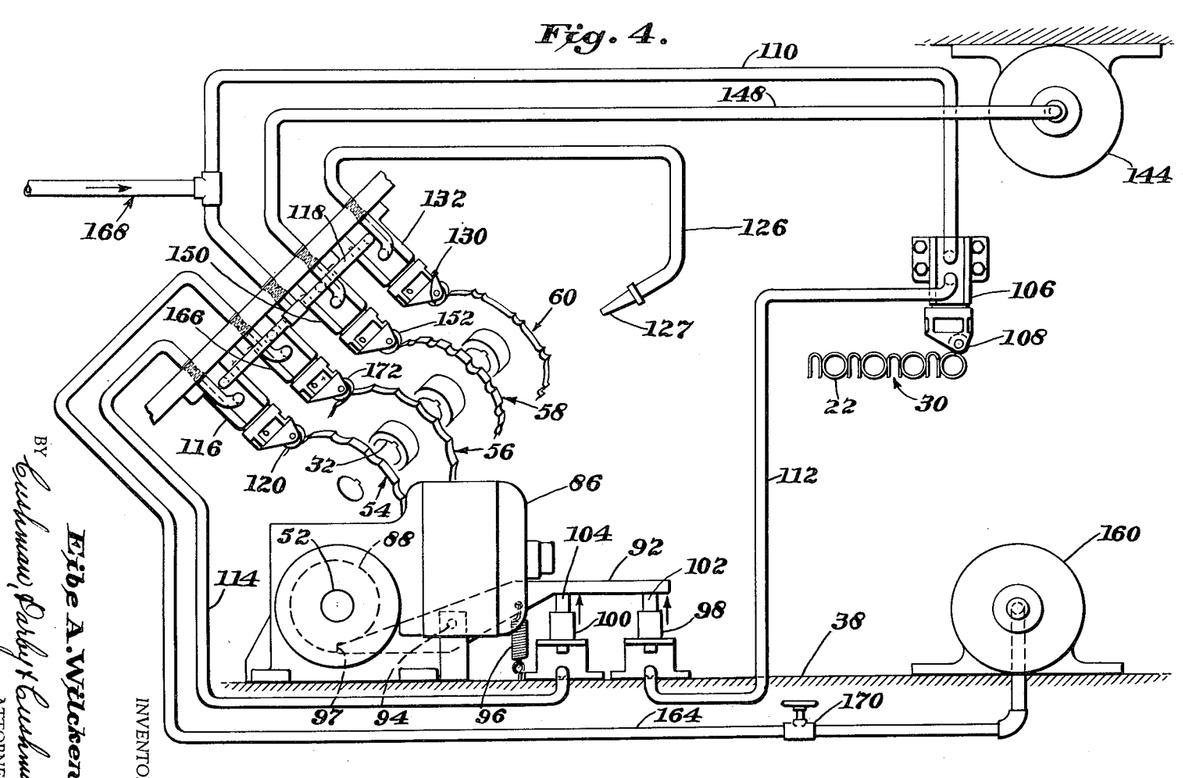
Figure 4 is a schematic view of the controls for the apparatus.

A suitable source of power, such as electric motor 86, is provided for driving rotatable carrier member 20. Electric motor 86 may be conveniently mounted on work table 38 of frame 10. Interposed between motor 86 and carrier member 20 is a single revolution clutch 88, as best shown in Figure 4, which is connected to worm 52 on one side thereof and to the motor drive shaft 90 on the other side thereof. A clutch operating lever 92, pivotally mounted on table 38 of frame 10, as indicated at 94, is adapted to engage a stop 97 on the one revolution clutch 88. Clutch operating lever 92 is spring biased into engagement with stop 97 of clutch 88 by means of a coil spring 96 interconnected between the lever and frame 10. A pair of air cylinders 98 and 100, having pistons 102 and 104 which engage lever 92, are provided for disengaging the lever 92 from clutch 88 so as to permit the drive shaft 90 (Figure 2) to drive the driven shaft or worm 52. As will be seen in Figure 4, when piston 102 is raised, it will engage lever 92 to disengage it from stop 97 of single revolution clutch 88 allowing drive shaft 90 of electric motor 86 (Figure 2) to rotate the worm 52 one revolution.

To operate air cylinder 98 and its corresponding piston 102, a suitable air valve 106 is mounted on frame 10 in such a position that it can be operated by tubes 22 leaving carrier member 20. Valve 106 is provided with a trip roller 108 extending into the path of tubes 22 traveling on take-off conveyor 30. When a tube engages trip roller 108, valve 106 will be caused to open and to allow compressed air from a suitable source of supply 168 to travel through the air lines 110 and 112 to air cylinder 98. Thus, piston 102 will rise and engage lever arm 92 causing the lever arm to pivot about the pivot point 94 and release clutch 88 so that worm 52 will rotate a single revolution.

However, since one revolution of worm 52 will only rotate carrier member 20 one twenty-fourth of a revolution, it is necessary that lever arm 92 be maintained in the released or disengaged position while clutch 88 permits worm 52 to continue rotating. To accomplish this, a second air cylinder 100 is provided with its corresponding piston 104 adapted to engage lever arm 92. Air cylinder 100 is connected by an air line 114 to the air valve 116. Air valve 116 is in turn connected by the manifold 118 to the suitable source of air supply generally indicated 168. To operate air valve 116, a cam 54 is provided on shaft 32 of rotatable carrier member 20 and is adapted to engage a cam follower or roller 120 which actuates valve 116. When air valve 106 is tripped momentarily by the tubes 22 on conveyor 30, a cycle of operation of the apparatus begins. In other words, air cylinder 98 will actuate lever 92 to cause clutch 88 to be released for one revolution, but since the air is only supplied momentarily to air cylinder 98 cam 54 which begins to rotate when carrier member 20 starts its rotation, will engage cam follower or roller 120 on valve 116 and permit air to actuate air cylinder 100 and its corresponding piston 104. Piston 104 will engage lever 92 and maintain it in its released or disengaged position from stop 97 of the clutch 88 for approximately two revolutions of worm 52 whereby carrier member 20 will rotate one-eighth of a revolution. By rotating one-eighth of a revolution, carrier member 20 will bring another set of recesses 44 and 46 into registry with chute 70 whereby a tube 22 from hopper 24 may be received horizontally therefrom. The above described operation will be repeated as soon as trip roller 108 is actuated by another tube on take-off conveyor 30 whereby another increment of rotation of carrier member 20 begins.

Figure 7:
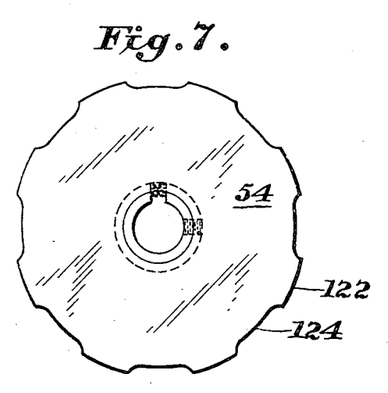
Figure 7A:
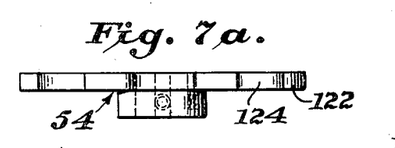

The configuration of cam 54 may be seen in detail in Figures 7 and 7a. It will be noted that cam 54 is provided with eight rises 122 and eight depressions 124, thus, corresponding to the number of tube receiving recesses on the periphery of carrier member 20. Roller 120 will ride in a depression 124 when valve 116 is closed, however, upon rotation of carrier member 20 and cam 54, the roller will engage the rise 122 and will maintain the valve 116 open for the necessary period to cause carrier member 20 to continue to rotate until it has rotated one-eighth of a complete revolution. In other words, air valve 116 is in the open position, supplying compressed air to air cylinder 100, until such time that clutch 88 has permitted worm 52 to rotate two revolutions in addition to the rotation of one revolution caused by the momentary actuation of air cylinder 98.

Although the control for rotation of the carrier member 20 provides for increments of rotation of the carrier member equal to one-eighth of a revolution, it is obvious that it is within the scope of the invention to increase or decrease the number of recesses on the periphery of the carrier member and, thus, require a gear change and cam configuration change to take care of the necessary increments of rotation involved in one complete rotation.

As previously stated, closures or plugs 26 are successively fed from hopper 28 to the recesses 72 in upper dial 40, when the same come into register with chute 76. To insert the closures into tubes 22, also positioned on the carrier member, is an air tube 126 mounted on frame 10. Air tube 126 provides intermittent air blasts against the side of the closures or plugs during the rotation of the carrier member and causes the plugs to be blown into the tubes where they seat against the rolled-in opposite end.

Referring to Figures 1a and 2, outlet end 127 of air tube 126 is positioned adjacent a third semicircular recess or groove 128 in upper dial 40. Groove 128 is somewhat smaller in diameter than either recess 72 or 46 but is in longitudinal alignment therewith and is adapted to register with outlet 127 of air tube 126 as carrier member 20 is rotated. The air jet is supplied to air tube 126 from the source of compressed air 168 and will be directed against the side of the closure positioned on its end in recess 72, forcing the closure out of the recess 72 into the end of a tube 22 adjacently positioned in the recesses 46 and 44 of carrier member 20.

Figures 9, 10:
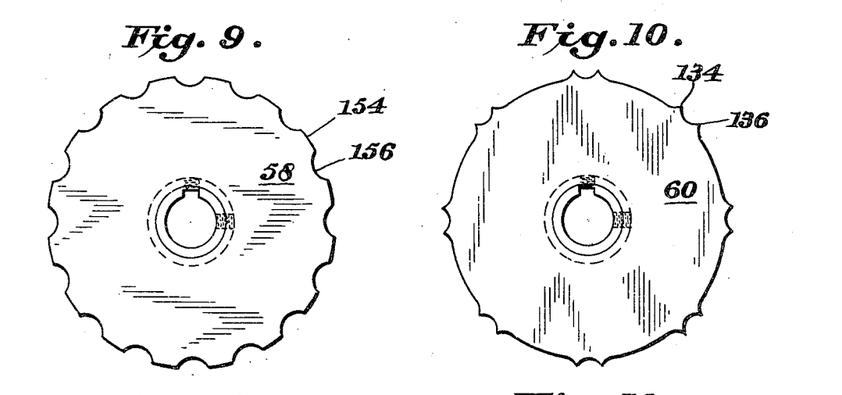
Figures 9A, 10A:
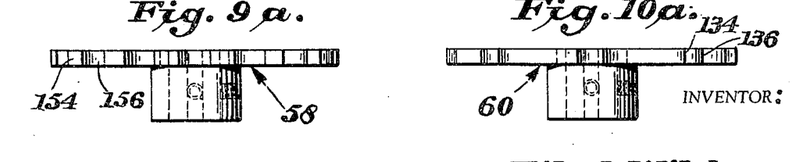

In order that each closure is properly inserted into an adjacently positioned tube, means are provided for applying intermittent air jets to blast against the side of the closure as the carrier member rotates one-eighth of a revolution or through one complete cycle of operation. To obtain this result, a cam 60 is provided on shaft 32 of rotatable carrier member 20. Cam 60 cooperates with a cam follower or roller 130 which actuates an air valve 132. When air valve 132 is opened by cam 60, compressed air from manifold 118 will be supplied to air tube 126. The configuration of cam 60 is shown in Figures 10 and 10a. It will be noted that cam roller 130 will engage the two rises 134 and 136 during a one-eighth revolution of carrier member 20. Consequently, valve 132 will be opened twice, thereby, allowing two separate air jets to be applied against a closure 26 so that it will be properly inserted in the tube 22. Further, the air tube 126 is positioned so that the air jet will hit against the side of a closure as the closure and its corresponding tube are moved from a horizontal position toward the vertical. In other words, as soon as the tubes and closures are moved by carrier member 20, cam 60 operates valve 132 to permit the air jet to be applied through tube 126. Of course, as the carrier member 20 is rotated through subsequent cycles of operation, the tubes 22 will approach the vertical, and should a closure not be positioned at the bottom of the tube, it will then fall by gravity and be maintained in place by the inturned edges thereof.

As previously stated, closures 26 are supplied from a hopper 28 having a rotatable cylindrical element 74 therein. It is necessary that element 74 be rotated at the same time that carrier member 20 is rotated so that closures are agitated and supplied to chute 76. Thus, referring to Figures 5 and 6 it will be noted that cylindrical element 74 is adapted to be rotated on a shaft 138 which extends through the bottom of hopper 28. Adapted to engage shaft 138 and cause it to rotate is an overrunning one-way clutch generally indicated 140 and having a clutch operating arm 142. Mounted on frame 10, in a suitable position, is an air cylinder 144 having a piston 146 extending therefrom and adapted to be connected to clutch arm 142 of overrunning clutch 140. Air cylinder 144 is connected by means of air line 148 to an air valve 150. Air valve 150 is operable by a cam follower or roller 152 which engages the rises on cam 58. As shown in Figures 9 and 9a, cam 58 is provided with rises 154 and depressions 156. Since it is advantageous to intermittently operate cylindrical element 74 so that the caps will not become wedged or jammed and so that they will feed properly to chute 76, cam 58 will operate air valve 150 a plurality of times during the one-eighth revolution of rotation of carrier member 20. Consequently, valve 150 will be opening and closing, causing air to be supplied intermittently through the air line or conduit 148 to air cylinder 144 and thereby intermittently rotating cylindrical element 74 a plurality of times during a one-eighth revolution of rotation of carrier member 20. The number of times cylindrical element 74 is caused to rotate during the rotation of an increment of a revolution of carrier member 20 is dependent on the number of rises 154 on cam 58.

As previously stated, tubes 22 with a closure inserted therein are removed from carrier member 20 when carrier member 20 has rotated to such a position that the tubes are oriented from a horizontal to a vertical position. To remove tubes 22 an ejector mechanism 61 is provided and includes an ejector arm 64 pivotally mounted on one of the standards 12 by means of a rotatable collar 62. Ejector arm 64 extends between the upper dial 40 and the lower dial 42 and will be pivoted outwardly (Figure 2) to engage tube 22 to transfer it vertically to take-off conveyor 30 where the tube is then transferred to the cork rod packing machine.

Mounted on the lower end of rotatable collar 62 is a radially extending arm 158. Positioned on work table 38 of frame 10 is an air cylinder 160 having a piston element 162 connected to arm 158. Movement of piston 162 will cause arm 158 to pivot, consequently, rotating collar 62 and ejector arm 64.

Air cylinder 160 is connected to the source of air supply 168 by an air tube 164 which extends to an air valve 166. The inlet to air valve 166 is connected to manifold 118, which in turn is connected to the source of air supply 168. Intermediate air valve 166 and air cylinder 160, a speed control valve 170 of any suitable type may be provided to control the speed of actuation of ejector arm 64.

Figure 8:
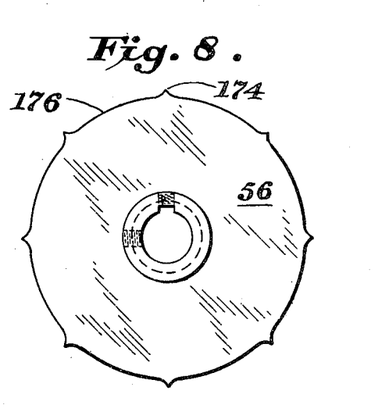
Figure 8A:
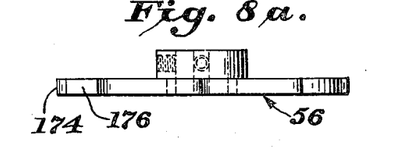

Air valve 166 is provided with a cam follower or roller 172 which is adapted to cooperate with a cam 56 mounted on shaft 32 of carrier member 20. Cam 56, as best shown in Figure 8, is provided with a plurality of rises 174 and depressions 176. The rises equal in number the increments which it takes carrier member 20 to make one complete revolution. In other words, eight rises are provided on cam 56. Each rise will momentarily open air valve 166 during one increment of rotation of carrier member 20. By proper positioning cam 58 on shaft 32, ejector arm 64 will be actuated once during a rotation of carrier member 20 and at such a time when the tube 22 carried by carrier member 20 approaches a vertical position.

*Operation*

In summation, the operation of the present device is as follows:

Tubes 22 are horizontally placed in hopper 24 while plugs or closures 26 are indiscriminately placed in hopper 28. The apparatus, which is provided with a frustoconical carrier member 20 mounted on a 45° axis, receives tubes 22 in a horizontal position and simultaneously receives plugs 26 properly oriented in hopper 28 adjacent the open ends of tubes 22. The apparatus is started by tripping air valve 106 which permits the single revolution clutch 88 to be released so that worm 52 and worm gear 50 will rotate. In order that carrier member will be rotated one-eighth of a complete revolution so that another pair of recesses 44 and 46 are brought into registry with hopper 24, the cam 54 on the shaft 32, which rotates carrier member 20, actuates an air cylinder 100 to maintain trip lever 92 in the tripped position so that clutch 88 will be permitted to rotate worm 52 two more complete revolutions. After clutch 88 has permitted worm 52 to rotate three complete revolutions, the carrier member will have rotated one-eighth of a complete revolution and the above-mentioned steps are again repeated so that tubes on the carrier member are successively transferred from a horizontal to a vertical position.

During one increment of rotation of carrier member 20, a complete cycle of operation of the machine occurs. This is accomplished by providing a plurality of cams on the drive shaft 32 of carrier member 20. Each cam will cause a necessary operation in the cycle of the apparatus. First, the cam 60 will operate air valve 132 to permit a plurality of air jets to be directed against the side of a closure positioned adjacent the end of a horizontally positioned tube. The air jets will cause the closure to be inserted into the tube. Second, cam 58 will operate air valve 150 to permit air cylinder 144 to operate and rotate the cylindrical element mounted in hopper 28. This results in closures being agitated and moved down chute 76 into position in the closure recesses 72 on carrier member 20 as they come into registry with chute 76.

The final operation during a cycle of the machine is the ejecting of the tubes 22 as they come into a vertical position on the carrier member. A cam 56 operating air valve 166 will in turn operate the air cylinder 160 to actuate the ejector mechanism 61. Ejector arm 64 will be pivoted and in turn engage a vertically positioned tube 22 and transfer it to take-off conveyor member 30 where it may be conveyed to a cork rod packing machine or the like.

The terminology used in the specification is for the purpose of description and not for limitation as the scope of the invention is defined in the claims.

I claim:

1. In an apparatus for inserting closures into containers, a container feeding device for successively feeding containers, a rotatable carrier member positioned below the container feeding device and having pockets therein positioned about its periphery for successively receiving containers in a horizontal position and transferring them to a vertical position upon 180° rotation of said carrier member, a closure feeding device positioned above said carrier member for feeding closures thereto, means on said carrier member for receiving and positioning said closures adjacent the end of said containers when the containers are in the horizontal position, means for inserting said closures into said containers after said closures have been positioned on said carrier member and while said containers are being moved from their horizontal position to their vertical position, and means for intermittently rotating said carrier member in step by step increments to position one of said pockets and said first-mentioned closure positioning means in communication with said container and closure feeding devices respectively whereby one of the containers is positioned horizontally in the pocket and one of the closures is positioned adjacent the ends of the horizontally positioned container.

2. An apparatus of the character described in claim 1 wherein said means for insertion of the closure into the container is an air jet.

3. In an apparatus of the character described in claim 1 wherein said means for positioning the closure adjacent the end of said container are pockets positioned on said rotatable carrier member adjacent to and in communication with the container receiving pockets.

4. In an apparatus of the character described in claim 1 wherein said means for positioning the closures adjacent the ends of said containers are pockets positioned on said rotatable carrier member adjacent to and in communication with the container receiving pockets, and said means for insertion of the closure into the containers is an air jet directed against the closures after they have been positioned on said rotatable carrier member adjacent the end of the container.

5. In an apparatus for inserting closures into elongated tubes, a rotatable frusto-conical carrier member mounted on an oblique axis to the vertical, said carrier member having a plurality of tube receiving recesses thereon and a plurality of closure receiving recesses thereon adjacent one end of and in communication with said tube receiving recesses, said tube and closure receiving recesses being positioned so that the uppermost tube and closure receiving recesses are in a horizontal position while the lowermost tube and closure receiving recesses are in a vertical position, means for intermittently rotating said carrier member in step by step increments, a tube hopper positioned above said carrier member for successively feeding tubes to said tube receiving recesses as they come into their horizontal position, and a closure hopper positioned above said carrier member and having means communicating with said closure recesses when in their horizontal position for successively positioning the closures therein adjacent the ends of tubes positioned on said carrier member.

6. In an apparatus for inserting closures into elongated tubes, a rotatable frusto-conical carrier member mounted on an oblique axis to the vertical, said carrier member having a plurality of tube receiving recesses thereon and a plurality of closure receiving recesses thereon positioned adjacent one end of and in open communication with said tube receiving recesses, said tube and closure receiving recesses being positioned so that the uppermost tube and closure receiving recesses are in a horizontal position while the lowermost tube and closure recesses are in a vertical position, means for intermittently rotating said carrier member in step by step increment, a tube hopper positioned above said carrier member for successively feeding tubes to said tube receiving recesses as they come into their horizontal position, a closure hopper positioned above said carrier member and having means communicating with said closure recesses when they come into their horizontal position for positioning a closure therein adjacent the end of a tube, and means operative upon rotation of said carrier member to insert a closure positioned in the closure recess into an adjacently positioned tube, said last mentioned means including an air jet directed against the side of a closure.

7. In an apparatus of the character described in claim 6 wherein said air jet is intermittently applied upon rotation of said carrier member.

8. In an apparatus for inserting closures into elongated tubes, a rotatable frusto-conical carrier member mounted on an oblique axis to the vertical, said carrier member having a plurality of spaced tube receiving recesses on the frustum of said carrier member and a plurality of spaced closure receiving recesses also on the frustum of said carrier member in longitudinal alignment and open communication with said tube receiving recesses, said closure receiving recesses being smaller than said tube receiving recesses and being positioned on the frustum of said carrier member in longitudinal alignment with said tube receiving recesses and adjacent the smallest end of the carrier member, said tube and closure receiving recesses also being positioned on the carrier member so that the uppermost tube receiving recess and its aligned closure receiving recess are in a horizontal position while the lowermost tube receiving recess and its aligned closure receiving recess are in a vertical position, means for intermittently rotating said carrier member in step by step increments, a tube hopper positioned above said carrier member and adapted to successively feed tubes horizontally to said tube receiving recesses as they come into their horizontal position, a closure hopper also positioned above said carrier member and having means in communication with said carrier member for feeding closures to said closure receiving recesses when they come into their horizontal position, means operative upon rotation of said carrier member to insert closures positioned in the closure receiving recesses into adjacently positioned tubes, and means for removing tubes with their inserted closures when the tube has been transferred from the horizontal to the vertical position.

9. In an apparatus of the character described in claim 8 wherein said means for removing the vertically positioned tube with its inserted closure is a conveyor for vertically receiving the tubes and an arm intermittently operated to engage the tube on said carrier member when it reaches its vertical position and transfer the tube therefrom to said conveyor.

10. In an apparatus of the character described in claim 8 including means to retain said tubes in said tube receiving recesses when said carrier member is rotated.

11. In an apparatus of the character described in claim 8 wherein said means for inserting the closures into the tubes is an air tube mounted adjacent said closure receiving recesses forward of the position where the tubes and closures are received by said carrier member.

12. In an apparatus of the type described in claim 11 wherein said air tube provides intermittent air jets upon rotation of said carrier member.

13. In an apparatus for inserting closures into elongated tubes, a rotatable frusto-conical carrier member mounted on an oblique axis to the vertical, said carrier member including spaced upper and lower dial elements, the lower of said dial elements being larger than the upper of said dial elements, said upper and lower dial elements having peripheral edge surfaces lying in the frustum of said carrier member, each of said upper and lower dial elements having a plurality of circumferentially spaced tube receiving recesses on their respective peripheral surfaces, the recesses on said upper dial element being in longitudinal alignment with the recesses of said lower dial element so as to cooperate with each other to receive the tubes horizontally therebetween and support them by their ends and transfer them to a vertical position upon 180° rotation of said carrier member, said upper dial element also having a closure receiving recess positioned on its peripheral surface adjacent each of said tube receiving recesses, said closure receiving recess being in communication with its corresponding tube receiving recess, a tube hopper communicating with said tube receiving recesses of said upper and lower dial elements for positioning a tube in said recesses as they come into their horizontal position, a closure hopper communicating with the closure receiving recesses on the peripheral surface of the upper dial element for positioning a closure in said recesses when said recesses come into their horizontal position, means for inserting the closures into said tubes after closures and tubes have been positioned on the carrier member, said last mentioned means including an air tube mounted adjacent said upper dial element and directed toward said closure receiving recesses, and means for removing the tubes from said carrier member when said tubes are transferred to the vertical position.

14. In an apparatus of the character described in claim 13 wherein said means for removing the vertically positioned tubes with the closures inserted therein is a conveyor for vertically receiving the tubes and an arm positioned between the upper and lower dial elements and intermittently operated to engage the tube carrier by said dial elements when it reaches the vertical position and transfer the tube therefrom to said conveyor.

15. In an apparatus of the character described in claim 13 including means on said carrier member to longitudinally retain the tubes in said tube receiving recesses when said carrier member is rotated.

16. In an apparatus of the character described in claim 13 wherein said air tube provides intermittent air blasts upon rotation of said carrier member.

17. In an apparatus of the class described, a rotatable carrier member mounted on an oblique axis to the vertical and having means thereon for successively receiving containers in a substantially horizontal position and transferring them to a substantially vertical position upon 180° rotation thereof, said carrier member also having means thereon adjacent to said first mentioned means for positioning closures adjacent the ends of containers when the containers are in a horizontal position, a container feeding device for feeding containers to said carrier receiving means, a closure feeding device for feeding closures to said closure receiving means, a take-off conveyor for removing containers vertically positioned on said carrier member, means for intermittently rotating said carrier member, said means being positioned adjacent said take-off conveyor and being operable by containers on said take-off conveyor, means operative by rotation of said carrier member to successively feed closures from said closure feeding device to said closure positioning means on said carrier member, means operative by rotation of said carrier member for inserting closures into containers after the closures have been positioned on said carrier member adjacent the ends of the containers, and means also operative by rotation of said carrier member to transfer containers vertically positioned on said carrier member to said take-off conveyor.

18. In an apparatus of the class described, a rotatable carrier member mounted on an oblique axis to the vertical and having means thereon for successively receiving containers in a substantially horizontal position upon 180° rotation thereof, said carrier member also having means thereon adjacent to said first mentioned means for positioning closures adjacent the ends of the containers when the containers are in a horizontal position, a container feeding device for feeding containers to said container receiving means, a closure feeding device for feeding closures to said closure receiving means, means mounted adjacent said carrier member for inserting closures into containers positioned thereon as the containers are transferred from the horizontal to the vertical position, and a cam mechanism actuated upon rotation of said carrier member to operate said closure inserting means.

19. In an apparatus of the character described in claim 18 wherein said closure inserting means includes an air tube for providing an air blast against the closures to insert the same into the container, and said cam mechanism includes a cam rotatable by said carrier member, and an air valve in communication with said air tube and operative by said cam to supply the air blasts to said air tube.

20. In an apparatus of the character described in claim 19 including means for intermittently rotating said carrier member in step by step increments so that it can successively receive containers and closures from said container and closure feeding devices respectively, and wherein said air valve is operated a plurality of times by said cam during an increment of rotation of said carrier member whereby a plurality of air blasts are provided to insert the closures into the containers.

21. In an apparatus of the class described, a rotatable carrier member mounted on an oblique axis to the vertical and having means thereon for successively receiving containers in a substantially horizontal position and transferring them to a substantially vertical position upon 180° rotation thereof, a take-off conveyor cooperating with said carrier member for receiving the containers therefrom after they have been transferred to a vertical position, means for intermittently rotating said carrier member in step by step increments, said last-mentioned means including a source of power for rotating said carrier member, a clutch member interconnecting said source of power with said carrier member, means to prevent operation of said clutch member, said means being actuated by containers removed from said carrier member to momentarily release said clutch member for operation whereby said carrier member begins to rotate and means actuated by rotation of said carrier member to maintain said clutch member in the operating position until said carrier member has rotated a predetermined increment.

22. In an apparatus of the class described, a rotatable carrier member mounted on an oblique axis to the vertical and having means thereon for successively receiving containers in a substantially horizontal position and transferring them to a substantially vertical position upon 180° rotation thereof, a take-off conveyor cooperating with said carrier member for receiving the containers therefrom after they have been transferred to the vertical position, means for intermittently rotating said carrier member in step by step increments, said last mentioned means including a source of power for rotating said carrier member, a single revolution clutch interconnecting said source of power with said carrier member, a clutch operating lever, means actuated by the containers removed from said carrier member to initially and momentarily release said clutch operating lever from said clutch whereby said clutch can rotate a single revolution and rotate the carrier member a portion of an increment of rotation, and means actuated by rotation of said carrier member for maintaining said clutch operating lever in the released position until said carrier member has rotated a predetermined increment.

23. In an apparatus of the character described in claim 22 wherein said means to initially and momentarily release the clutch operating lever from said clutch includes an air valve operable by containers removed from said carrier member, and an air cylinder in communication with said air valve and operable to engage and release said clutch operating lever from said clutch when said air valve is actuated.

24. In an apparatus of the character described in claim 23 wherein said means for maintaining said clutch operating lever in the released position includes a cam rotatable by said carrier member, a second air valve operable by the rotation of said cam, and a second air cylinder in communication with said second air valve and operable to engage and maintain said clutch operating lever in the released position until said carrier member has rotated a predetermined increment.

25. In an apparatus of the class described, a rotatable carrier member mounted on an oblique axis to the vertical and having means thereon for successively receiving containers in a substantially horizontal position and transferring them to a substantially vertical position upon 180° rotation thereof, said carrier member also having means thereon adjacent to said first memtioned means for positioning closures adjacent the ends of the containers when the containers are in the horizontal position, means to insert the closures in the containers when the containers are being moved from the horizontal to the vertical position, a container feeding device for successively feeding containers to said container receiving means, a closure feeding device for successively feeding closures to said closure receiving means, said closure feeding device including a hopper having a rotatable cylindrical element therein for orienting and feeding the closures, means for intermittently rotating said carrier member in step by step increments and means operable by the rotation of said carrier member to cause said cylindrical element in said closure hopper to rotate.

26. In an apparatus of the character described in claim 25 wherein said last mentioned means includes a cam rotatable by said carrier member, an air valve operable by said cam when the same is rotated, an air cylinder in communication with said air valve, and a clutch connected to said air cylinder and operable thereby, said clutch being operable to rotate said cylindrical element in the closure hopper intermittently in only one direction of rotation.

27. In an apparatus of the character described in claim 26 wherein said cam operates said air valve a plurality of times during an increment of rotation of said carrier member thereby causing said cylindrical element to intermittently rotate during an increment of rotation of said carrier member.

28. In an apparatus of the type described, a rotatable carrier member mounted on an oblique axis to the vertical and having means thereon for successively receiving containers in a substantially horizontal position and transferring them to a substantially vertical position upon 180° rotation thereof, a take-off conveyor cooperating with said carrier member for receiving the containers therefrom after they have been transferred to a vertical position, means for intermittently rotating said carrier member in step by step increments, ejector means for ejecting said containers from said carrier member and transferring them to said take-off conveyor, said ejector including a pivotal lever element for engaging said containers, means interconnected to said ejector means and operable by the rotation of said carrier member to actuate said ejector means, said last mentioned means including a cam rotatable by said carrier member, an air valve operable by said cam, an air cylinder in communication with said air valve and interconnected to said pivotal lever element of said ejector means.

29. In an apparatus of the character described in claim 28 wherein said cam opens said air valve during the final portion of an increment of rotation of said carrier member whereby said air cylinder will actuate said lever element to engage a container on said carrier member when the container is being transferred to a substantially vertical position thereon.

30. In an apparatus of the class described, a rotatable carrier member mounted on an oblique axis to the vertical and having means thereon for successively receiving containers in a substantially horizontal position and transferring them to a substantially vertical position upon 180° rotation thereof, said carrier member also having means thereon adjacent said first mentioned means for positioning closures adjacent the ends of containers, a container feeding device for feeding containers to said container receiving means, a closure feeding device for feeding closures to said closure receiving means, a take-off conveyor cooperating with said carrier member for receiving containers transferred therefrom when the containers are in a vertical position, means for intermittently rotating said carrier member in step by step increments, said last mentioned means being initially and momentarily operated by containers being removed from said carrier member and continuously operated for a predetermined time by rotation of said carrier member, means operable by rotation of said carrier member to successively feed closures from said closure feeding device to said closure positioning means on said carrier member, means operable by rotation of said carrier member for inserting closures into containers after the closures have been positioned on said carrier member adjacent the end of the containers, and means also operable by rotation of said carrier member to transfer containers vertically positioned on said carrier member to said take-off conveyor.

References Cited in the file of this patent
UNITED STATES PATENTS

| | | |
|---|---|---|
| 908,426 | Schmidt | Dec. 29, 1908 |
| 1,165,700 | Muessel | Dec. 28, 1915 |
| 1,433,251 | Annen | Oct. 24, 1922 |
| 1,833,524 | Bre Miller | Oct. 18, 1932 |
| 2,282,576 | Hamilton et al. | May 12, 1942 |